United States Patent [19]

Schmermund

[11] 3,909,330

[45] Sept. 30, 1975

[54] METHOD OF, AND DEVICE FOR, PROVIDING A WEB OF PACKAGING MATERIAL WITH A TEAR STRIP

[76] Inventor: Alfred Schmermund, 62 Kornerstrasse, 5820 Gevelsberg, Germany

[22] Filed: Nov. 1, 1973

[21] Appl. No.: 411,876

[30] Foreign Application Priority Data
Nov. 17, 1972 United Kingdom............... 53143/72

[52] U.S. Cl. ............... 156/252; 156/257; 156/285; 156/302; 156/497; 156/514; 156/520; 93/1 TS
[51] Int. Cl.² ................. B32B 31/00; B31D 1/00; B32D 25/08
[58] Field of Search............. 93/1 TS; 156/514, 252, 156/257, 256, 285, 302, 497, 520

[56] References Cited
UNITED STATES PATENTS

| | | | |
|---|---|---|---|
| 2,864,285 | 12/1958 | Roselius .............................. | 93/1 TS |
| 3,046,847 | 7/1962 | Voege et al. ......................... | 93/1 TS |
| 3,431,827 | 3/1969 | Wahle et al. ......................... | 93/1 TS |
| 3,779,139 | 12/1973 | White.................................. | 93/1 TS |
| 3,799,044 | 3/1974 | Manolis............................... | 93/1 TS |

*Primary Examiner*—Charles E. Van Horn
*Assistant Examiner*—M. G. Wityshyn
*Attorney, Agent, or Firm*—Sughrue, Rothwell, Mion, Zinn & Macpeak

[57] ABSTRACT

A method of providing a web of packaging material with a tear strip is disclosed. The method comprises the steps of feeding such a web of packaging material along a feed path, perforating the moving web in a zone extending substantially parallel to the longitudinal edges thereof, cutting a strip from a web of tear-strip material, applying the cut strip to one surface of the web of packaging material to overlie the zone of perforation, applying suction to the respective opposite surface of the web of packaging material to retain the cut strip against said one surface, and bonding the cut strip to the web of packaging material. Advantageously, the bonding step comprises the application of heat to weld the cut strip of tear-strip material to the moving web of packaging material. Also disclosed is a device for carrying out the method. The device comprises feeder means to feed such a web of packaging material along a feed path, perforator means to perforate the moving web of packaging material in a zone substantially parallel to the longitudinal axis thereof, cutting means to cut a strip from a web of tear-strip material, applying means to apply the cut strip to one surface of the web of packaging material to overlie the zone of perforation, means for applying suction to the respective other surface of the web of packaging material to retain the cut strip against said one surface, and bonding means to bond the cut strip to the web of packaging material.

11 Claims, 5 Drawing Figures

METHOD OF, AND DEVICE FOR, PROVIDING A WEB OF PACKAGING MATERIAL WITH A TEAR STRIP

BACKGROUND OF THE INVENTION

This invention relates to a method of, and a device for, providing a web of packaging material with a tear strip.

In the formation of various kinds of packages, for example packages of viscose or cellulose film intended to receive a number of cigarettes to form a cigarette package of the "American" type, it may be desired to include a tear strip in the package, to facilitate opening of the package when desired by a purchaser.

Various methods and apparatus have been devised for the inclusion of a tear strip in a package, this normally taking place by affixing a tear strip to a web of packaging material which is to be cut into lengths, which are to be employed to wrap individual groups of rod-like articles such as cigarettes.

The basic procedure employed in prior processes is simply to cut individual strips from a web of tear strip material, to transport the strips into contact with a surface of a web of packaging material, and to fix the strips to the surface of the packaging material in such a manner that when the packaging material forms a wrapper surrounding rod-like articles and the purchaser pulls the tear strip then the package will tear along a predetermined path.

In some methods, as a web of packaging material is withdrawn from a supply reel or other source successive tear strips are placed against a surface of the web of packaging material with their longitudinal axes parallel to the longitudinal axis of the web of packaging material. In other methods, the longitudinal axes of the strips are each perpendicular to the longitudinal axis of the web of packaging material.

In one method, after a strip has been cut from a web of tear strip material it is held by suction applied by means of a member carrying a knife edge employed to carry out the cutting of the strip, and is then transferred by this member into contact with a web of packaging material and heat-welded to the packaging material web by contact with a hotplate or other heating device. In operation, this device requires the web of packaging material to remain stationary at the time of heat-welding, so that a relatively low rate of application of tear strips may be found to be necessary.

In another method, the leading edge of a cut strip is picked up by suction applied through the periphery of a roller, and then brought by rotation of the roller in contact with a web of packaging material. This process may be found to be unreliable in view of the small area of initial contact between the roller and the strip.

In yet another method, a length of strip material is bowed around part of the periphery of a roller prior to cutting of the strip, and the roller is then employed to bring the strip into contact with the web of packaging material. Difficulties may arise with this process as a result of the bowing of the strip.

Devices may be employed, which involve rotary knives of very complex construction, which require precise synchronism with other components of the device. Devices of this kind tend to be rather expensive to produce.

In some arrangements, a cut is made through a travelling web of packaging material in a direction parallel to the longitudinal axis of the web, before a tear strip is applied to the web. The strip is applied with its longitudinal axis parallel to that of the web of packaging material, the tear strip after its application then acting to join together again the two parts of the packaging material web severed as a result of the cut made through the web.

SUMMARY OF THE INVENTION

According to one aspect of the present invention, there is provided a method of providing a web of packaging material with a tear strip, comprising the steps of feeding such a web of packaging material along a feed path, perforating the moving web in a zone extending substantially parallel to the longitudinal edges thereof, cutting a strip from a web of tear-strip material, applying the cut strip to one surface of the web of packaging material to overlie the zone of perforation, applying suction to the respective opposite surface of the web of packaging material to retain the cut strip against said one surface, and bonding the cut strip to the web of packaging material.

The bonding step may comprise the application of heat to weld the cut strip of tear-strip material to the moving web of packaging material.

Alternatively, the bonding step may comprise the application of adhesive material to the cut strip to adhesively bond the latter to the moving web of packaging material.

According to a second aspect of the present invention, there is provided a device for providing a web of packaging material with a tear-strip, comprising feeder means to feed such a web of packaging material along a feed path, perforator means to perforate the moving web of packaging material in a zone substantially parallel to the longitudinal axis thereof, cutting means to cut a strip from a web of tear-strip material, applying means to apply the cut strip to one surface of the web of packaging material to overlie the zone of perforation, means for applying suction to the respective other surface of the web of packaging material to retain the cut strip against said one surface, and bonding means to bond the cut strip to the web of packaging material.

Various modes of perforation are possible for the web of packaging material, for example U-shaped tongue portions may be formed by discrete perforations, while alternatively simple linear slots or I-shaped perforations may be made, while another possibility is for circular apertures to be formed. Yet another alternative is given by a single incision extending through the full length of the web of packaging material.

An endless belt, permeable to air, may be provided to transport the web of packaging material with the tear strip applied thereto from the position of application of the tear strip to a heating station of the device, the endless belt passing around a pair of supporting rollers, at least one of which is driven to rotate. If desired, a further belt may be provided to co-operate with a section of the length of the permeable belt to guide the web of packaging material and tear strip between the two belts. The permeable belt, as well as the further belt, may be constructed of polytetrafluoroethylene. In any event, the further belt should be constructed of heat-resistant material.

The strength of the web of packaging material may be reduced as a result of the incisions made therein prior to the application of the tear strip, but the strength is restored upon the tear strip being applied. The tear strip forms a complete closure on one side of the incisions.

BRIEF DESCRIPTION OF THE DRAWINGS

An embodiment of the present invention will now be more particularly described with reference to the accompanying drawing, in which.

DESCRIPTION OF THE PREFERRED EMBODIMENTS

Figure 1:
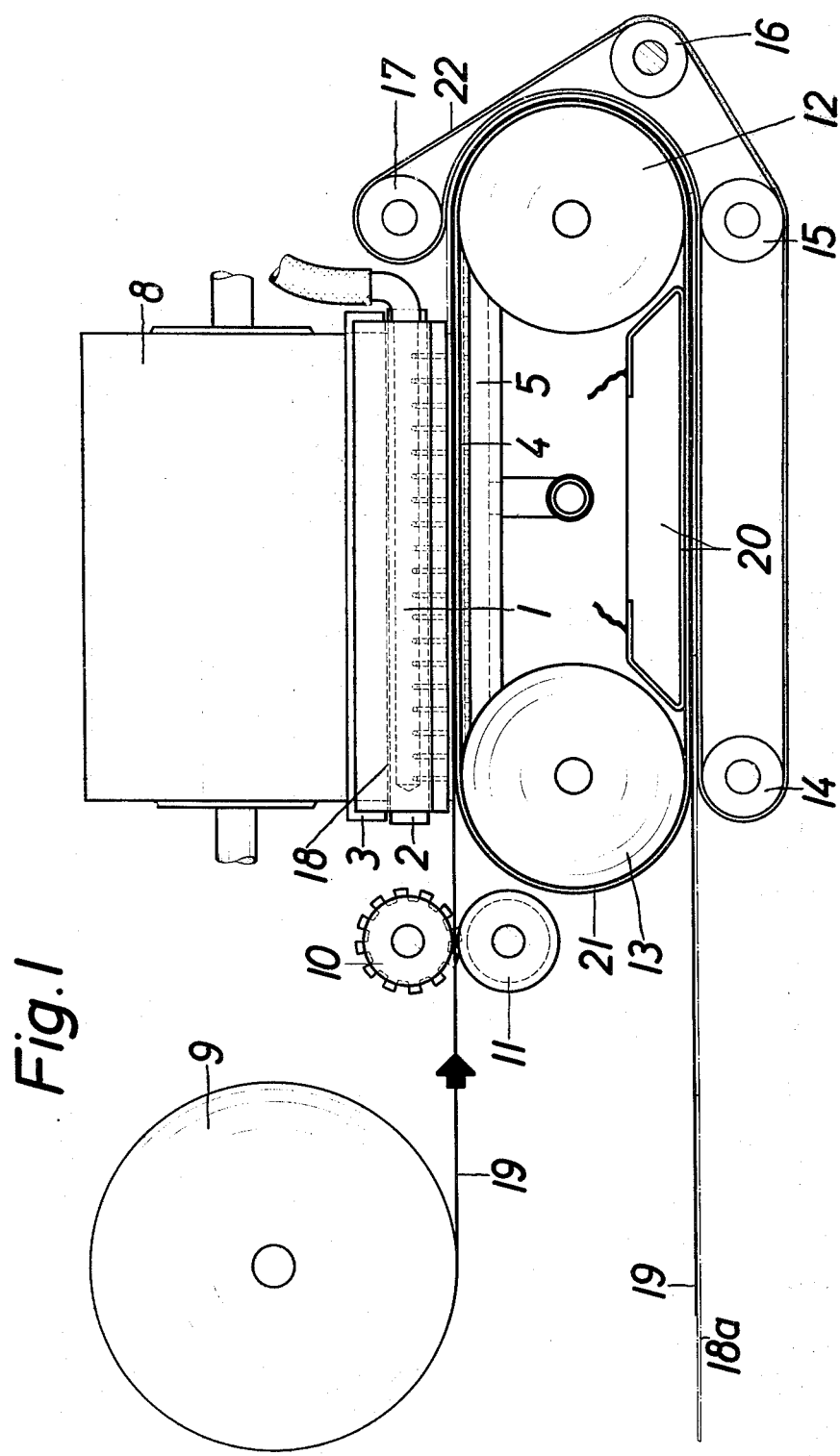
FIG. 1 shows a side elevation of an embodiment of device of the invention.
Figure 2:
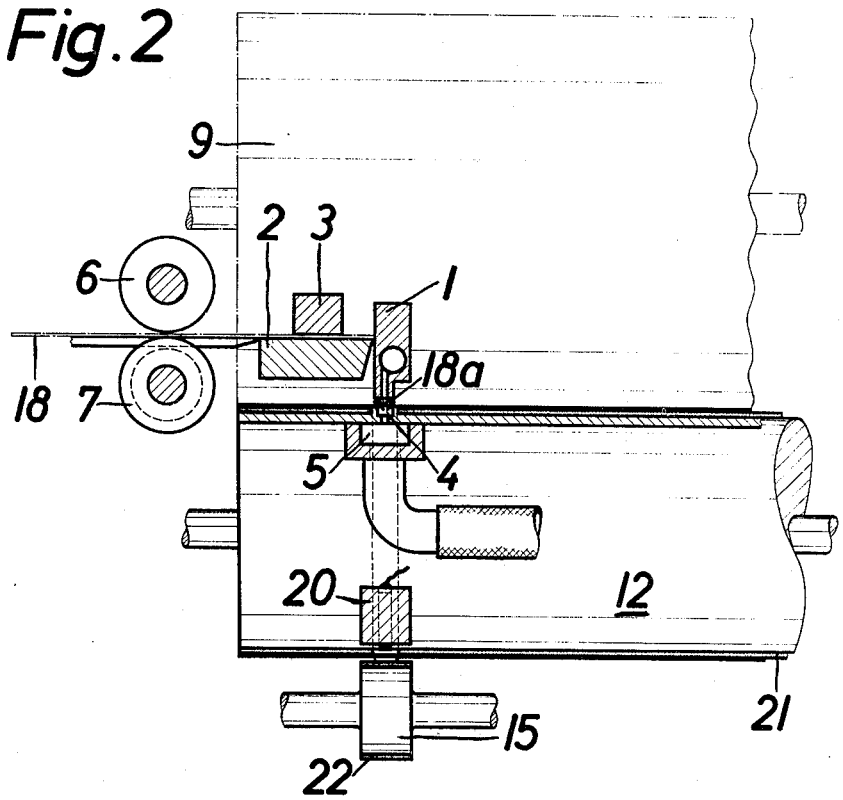
FIG. 2 shows, partly in section, the embodiment shown in FIG. 1, from a direction of view perpendicular to that of FIG. 1.

Referring to FIGS. 1 and 2, the construction of the illustrated device will now be set forth. Reference numerals 10 and 11 denote co-operable rotary members constituting a rotary perforator arrangement for providing perforations in a web 19 of packaging material drawn from a supply reel 9. If desired, the members 10 and 11 may be incorporated with transport rollers to draw the web 19 from the reel 9. However, transport rollers either upstream or downstream of the rollers 10 and 11 may be provided if required. Supporting rollers 12 and 13 support an endless belt 21 (more than one such belt side-by-side may be provided, if desired), the belt or belts 21 being permeable to air and passing over a supporting table arrangement extending between the rollers 12 and 13 and provided with a suction chamber 5. A single channel 4 (FIG. 2), extends in a direction parallel to the longitudinal axis of the adjacent part of the belt 21 and of the web 19 of packaging material, the channel 4 being arranged to be below a tear strip as the strip passes over the supporting table arrangement. The belt 21 is made of polytetrafluoroethylene. A supplementary belt 22, which is of heat-resistant material such as polytetrafluorethylene, passes around supporting rollers 14, 15, 16 and 17 in a generally L-shaped configuration, to co-operate with a portion of the belt 21 passing around the circumference of the roller 12 and the bottom portion of the belt 21 passing below a heating station at which an electrical heater 20 is provided. The supplementary belt has a much smaller width than the other belt. The co-operation of the belts 21 and 22 ensures accurate guiding of a web of packaging material having a tear strip applied thereto as the web and strip pass together around the roller 12 and in contact with the heating means 20.

A suction knife arrangement shown in FIG. 2 is provided to cut successive strips from a web 18 of tear strip material fed between rollers 6 and 7 from a supply reel 8 shown in FIG. 1. The suction knife arrangement comprises a stationary member 2 which co-operates with a movable member 1 constructed as a suction strip and provided with channels connectable to a source of suction. The member 1 is reciprocable up and down in FIG. 2 and co-operates with the stationary member 2 to cut strips off the web 18 and to place them (at 18a in FIG. 2) against the upper surface of an incised web of packaging material overlying the channel 4. At 3 in FIG. 2 there is shown a stationary holding device which holds the web 18 during the cutting of the strips 18a by the suction knife arrangement 1,2.

The webs 19 and 18 may be of any suitable material, for example viscose or cellulose film.

Figure 3:
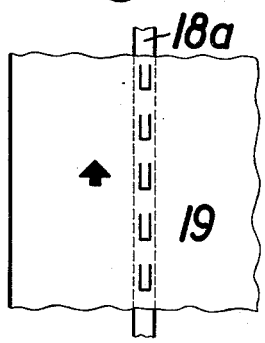
FIG. 3 shows one pattern of incisions formed in the web of packaging material.
Figure 4:
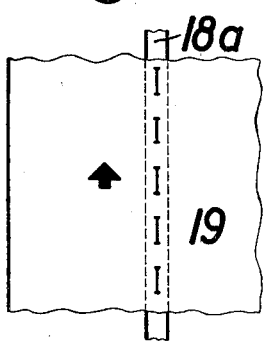
FIG. 4 shows a second pattern of incisions.
Figure 5:
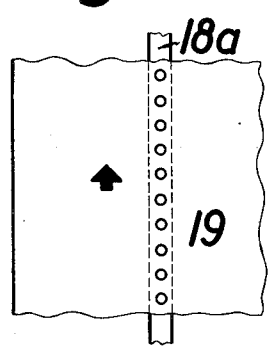
FIG. 5 shows a third pattern of incisions.

FIGS. 3, 4 and 5 show different types of incision which may be made in the web 19 of packaging material by alternative versions of the incising device 10, 11. In FIG. 3 there is shown an arrangement of substantially rectangular tongue portions having only one end of the rectangle in each case still attached to the main body of the web; in FIG. 4 there is shown an array of I-shaped incisions; and in FIG. 5 an array of collinearly arranged circular apertures. The incisions in each case have the function of transmitting the effect of suction applied to the side of the web of packaging material opposite to the tear strip to the other side of the web, so as to be effective in retaining the tear strip against the adjacent surface of the web of packaging material. The material of the web of packaging material is of course flexible, and the edges of the incisions can bend downwardly under the influence of the suction, thereby opening the incisions for the passage of air therethrough caused by the application of the suction.

Other patterns of incision are possible, for example point incisions, simple linear incisions, total severance of two parts of the web of packaging material, two spaced lines of incisions, two spaced rows of point incisions, apertures of various shapes, and tongues of shape different from that shown in FIG. 3. In each case, however, the function of the incisions is similar. An arrangement of incisions comprising a simple line of perforations has shown good results, since the effect of the suction can be to bend the parts of the web adjacent the incisions downwardly and to retain the tear strip against depressions thereby formed.

The operation of the above described embodiment will now be set forth.

The web 19 of packaging material is drawn from the supply reel 9 by the rollers incorporated with the members 10 and 11, or by differently positioned transport rollers if provided, and after being incised by the members 10, 11 passes over the belt 21 circulating continuously around rollers 12 and 13 in the clockwise sense in FIG. 1. The web 19 thus passes over the channel 4 connected to the suction chamber 5, underneath the suction knife arrangement 1, 2 which acts on the web 18 of tear strip material fed by the rollers 6 and 7. The direction of supply of the web 18 is perpendicular to that of the web 19, and the position of arrival of the web 18 at the knife arrangement 1, 2 is somewhat higher than the horizontal path of travel of the web 19, as shown in FIG. 2. The movable part 1 of the knife arrangement 1, 2 moves downwardly from its upper position to cut a strip 18a from the web 18 and retains the strip against the part 1 during further downward motion of the part 1 to deposit the strip 18a in the position shown in FIG. 2, whereupon the supply of suction to the part 1 is terminated. Suction applied to the suction chamber 5 is then effective in the channel 4 to retain the tear strip 18a against the portion of the web 19 of packaging material incised by the incising device 10, 11. The tear strip 18a effectively closes on one side the incisions produced by the rotary incising members 10 and 11, thereby producing the resistance to air flow necessary to enable the suction device to be effective in retaining the tear strip in position. The web 19 of packaging material with the tear strip retained there-against by the suction in the channel 4 then proceeds towards the roller 12, and passes around about half of the circumference of the roller 12, while being guided between the belt 21 and the belt 22. After leaving the roller 12, the web 19 with the strips 18a in position passes below an electrical heater 20, at which the strip 18a is secured to the web 19 by heat-welding. If desired, the application of adhesive may be employed in addition to, or instead of, the application of heat to the tear strips to fix the strips to the web of packaging material.

If desired, the device may be operated continuously, for example in such a manner that the end of each tear strip applied to the web of packaging material abuts against the adjacent end of the next following tear strip in each case, the movement of the web being uninterrupted. However, if desired, the motion of the web may be intermittent, the web being stationary as the member 1 approaches the end of its downward stroke and remaining stationary until the member 1 has commenced its next upward stroke. Using this form of intermittent movement of the web, it is still possible for the adjacent ends of successively applied tear strips to abut against each other.

After leaving the device with the tear strip 18a firmly secured by welding against the web 19, the assembly comprising the web and the tear strip may be fed directly to a packaging machine, for example a cigarette packaging machine, to form a package of cigarettes which may readily be opened when desired by pulling on the tear strip 18a. Before being applied around a group of cigarettes, the assembly is, of course, cut transversely of its length at intervals to form pieces of the desired length.

If desired, the illustrated form of suction knife arrangement may be replaced by a roller knife or other form of rotary knife, but in any event some form of impact knife or shearing device is employed.

As evident from the drawing, the width of the web 18 of tear strip material supplied from the reel 8 is equal to the desired length of the eventually cut tear strip. If desired, the material of the tear strip may be coloured, or may be provided with coloured portions intended eventually to be the end portions for gripping by the purchaser to open the package.

If desired, the incising device 10, 11 may be incorporated in a pair of transport roller arrangements, the outlines of which are shown in solid lines in FIG. 1.

The width of the heater 20 (in a direction perpendicular to the plane of the paper in FIG. 1) is somewhat greater than that of the tear strip, so that the entire width of the tear strip receives heat from the heater 20.

With judicious choice of operating conditions, the device is simple to operate and functions reliably and at a fairly high speed. For example, throughput rates such as to produce about 400 packages per minute are possible.

I claim:

1. A method of providing a web of packaging material with a tear strip, comprising, in combination, the steps of:

feeding said web of packaging material along a feed path;
    perforating said web in a zone extending substantially parallel to the longitudinal edges thereof;
    cutting a strip from a web of tear-strip material;
    applying said cut strip to one surface of said web of packaging material to overlie said zone of perforation;
    applying suction to the respective opposite surface of said web of packaging material to transmit said suction through said zone of perforation and thereby to retain said cut strip against said one surface; and
    bonding said cut strip to said web of packaging material.

2. A method as defined in claim 1, wherein said bonding step comprises the application of heat to weld said cut strip of tear-strip material to said web of packaging material.

3. A method as defined in claim 1, wherein said bonding step comprises the application of an adhesive material to said cut strip to adhesively bond said strip to said web of packaging material.

4. A device for providing a web of packaging material with a tear-strip, comprising, in combination:

feeder means to feed said web of packaging material along a feed path;
    perforator means to perforate said web of packaging material in a zone substantially parallel to the longitudinal axis thereof;
    cutting means to cut a strip from a web of tear-strip material;
    applying means to apply said cut strip to one surface of said web of packaging material thereby to cause said cut strip to overlie said zone of perforation;
    means for applying suction to the respective other surface of said web of packaging material to transmit said suction through said zone of perforation and therby to retain said cut strip against said one surface; and
    bonding means to bond said cut strip to said web of packaging material.

5. A device as defined in claim 4, wherein said perforator means comprises a rotary cutter comprising two mutually co-operable cutter members at least one of which is rotatable.

6. A device as defined in claim 4, wherein said cutting means comprises a reciprocatable elongate member and a stationary member arranged to co-operate with said elongate member to cut a said strip of tear-strip material, said elongate member being provided with channels selectably connectable to a source of vacuum pressure to apply suction to said cut strip and being displaceable to place said cut strip in contact with said one surface of said web of packaging material.

7. A device as defined in claim 4, wherein said means for applying suction to said other surface of said web of packaging material comprises a suction chamber having a wall provided with a single elongate channel therein to establish communication between said suction chamber and said other surface of said web, said channel extending longitudinally of said web feed path and being so positioned with respect thereto that said zone of perforation in said web overlies said channel when said web is fed along said feed path.

8. A device as defined in claim 7, wherein said web feeder means comprises at least one endless belt permeable to air extending next adjacent said wall of said suction chamber.

9. A device as defined in claim 8, comprising a further belt of heat-resistant material co-operating with a length of said permeable belt to guide said web of packaging material and said cut strip between said two belts.

10. A device as defined in claim 4, wherein said perforator means is adapted to make a plurality of substantially U-shaped incisions through said web of packaging material.

11. A device as defined in claim 4, wherein said perforator means is adapted to make a plurality of mutually spaced and substantially I-shaped incisions through said web of packaging material.

* * * * *